United States Patent
Dai et al.

(10) Patent No.: US 12,393,842 B2
(45) Date of Patent: Aug. 19, 2025

(54) SYSTEM AND METHOD FOR INCREMENTAL LEARNING USING A GROW-AND-PRUNE PARADIGM WITH NEURAL NETWORKS

(71) Applicant: The Trustees of Princeton University, Princeton, NJ (US)

(72) Inventors: Xiaoliang Dai, Princeton, NJ (US); Hongxu Yin, Princeton, NJ (US); Niraj K. Jha, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 940 days.

(21) Appl. No.: 17/613,284

(22) PCT Filed: Mar. 20, 2020

(86) PCT No.: PCT/US2020/023870
§ 371 (c)(1),
(2) Date: Nov. 22, 2021

(87) PCT Pub. No.: WO2020/236255
PCT Pub. Date: Nov. 26, 2020

(65) Prior Publication Data
US 2022/0222534 A1    Jul. 14, 2022

Related U.S. Application Data

(60) Provisional application No. 62/851,740, filed on May 23, 2019.

(51) Int. Cl.
*G06N 3/082*    (2023.01)
*G06N 3/044*    (2023.01)
*G06N 3/048*    (2023.01)

(52) U.S. Cl.
CPC .......... *G06N 3/082* (2013.01); *G06N 3/044* (2023.01); *G06N 3/048* (2023.01)

(58) Field of Classification Search
None
See application file for complete search history.

(56) References Cited

U.S. PATENT DOCUMENTS

| | | |
|---|---|---|
| 8,862,527 B2 | 10/2014 | Garner |
| 9,779,786 B1 | 10/2017 | Wu et al. |

(Continued)

FOREIGN PATENT DOCUMENTS

| | | |
|---|---|---|
| WO | 2017189859 A1 | 11/2017 |
| WO | 2019089339 A1 | 5/2019 |
| WO | 2020060659 A1 | 3/2020 |

OTHER PUBLICATIONS

Hassantabar et al. "SCANN: Synthesis of Compact and Accurate Neural Networks", 2021 IEEE, pp. 3012-3025.*

(Continued)

*Primary Examiner* — Maikhanh Nguyen
(74) *Attorney, Agent, or Firm* — MEAGHER EMANUEL LAKS GOLDBERG & LIAO, LLP

(57) ABSTRACT

According to various embodiments, a method for generating a compact and accurate neural network for a dataset that has initial data and is updated with new data is disclosed. The method includes performing a first training on the initial neural network architecture to create a first trained neural network architecture. The method additionally includes performing a second training on the first trained neural network architecture when the dataset is updated with new data to create a second trained neural network architecture. The second training includes growing one or more connections for the new data based on a gradient of each connection, growing one or more connections for the new data and the initial data based on a gradient of each connection, and (Continued)

iteratively pruning one or more connections based on a magnitude of each connection until a desired neural network architecture is achieved.

15 Claims, 8 Drawing Sheets

(56) References Cited

U.S. PATENT DOCUMENTS

| | | | | |
|---|---|---|---|---|
| 10,740,676 | B2* | 8/2020 | Durdanovic | G06N 3/082 |
| 10,936,913 | B2* | 3/2021 | Yao | G06F 18/217 |
| 11,120,333 | B2* | 9/2021 | Qiao | G06N 3/08 |
| 11,521,068 | B2* | 12/2022 | Dai | G06N 3/04 |
| 11,836,600 | B2* | 12/2023 | Baker | G06N 3/045 |
| 12,248,877 | B2* | 3/2025 | Xu | G06T 7/70 |
| 2016/0328253 | A1 | 11/2016 | Majumdar | |
| 2019/0122113 | A1* | 4/2019 | Chen | G06N 3/084 |
| 2020/0160185 | A1* | 5/2020 | Praveen | G06N 3/04 |
| 2021/0027166 | A1* | 1/2021 | Gorokhov | G06N 5/04 |
| 2021/0133540 | A1 | 5/2021 | Dai et al. | |
| 2021/0133571 | A1* | 5/2021 | Azizan Ruhi | G06N 3/08 |
| 2021/0182683 | A1* | 6/2021 | Dai | G06N 3/045 |
| 2022/0036150 | A1* | 2/2022 | Hassantabar | G06N 20/00 |

OTHER PUBLICATIONS

Karn et al. "Dynamically Generated Compact Neural Networks for Task Progressive Learning", 2020 IEEE, 5 pages.*
International Search Report and Written Opinion for corresponding PCT Application No. PCT/US2020/023870, dated Jun. 11, 2020.
Singh et al., "Multi-Layer Pruning Framework for Compressing Single Shot MultiBox Detector", arXiv:1811.08342v1, pp. 1-13, Nov. 320, 2018.
Dai, et al., "Grow and Prune Compact, Fast, and Accurate LSTMs", arXiv:1805.11797v2, pp. 1-11, May 31, 2018.
Strate et al., "Incremental training of deep convolutional neural networks," arXiv preprint arXiv:1803.10232, 2018.
Han et al., "Learning both weights and connections for efficient neural network", Proc. Advances in Neural Information Processing Systems, pp. 1135-1143, 2015.
Dai et al., "NeST: A neural network synthesis tool based on a grow-and-prune paradigm," IEEE Trans. on Com-puters, vol. 68, No. 10, pp. 1487-1497, Oct. 2019.
Yosinski et al., "How transferable are features in deep neural networks?", Proc. Advances in Neural Information Processing Systems, pp. 3320-3328, 2014.
Li et al., "Learning without forgetting", IEEE Trans. on Pattern Analysis and Machine Intelligence, vol. 40, No. 12, pp. 2935-2947, 2018.
Yan et al., "HD-CNN: Hierarchical deep convolutional neural networks for large scale visual recognition", Proc. IEEE Int. Conf. Computer Vision, 2015.
Chen et al., "Net2Net: Accelerating learning via knowledge transfer," arXiv preprint arXiv:1511.05641, 2016.
Xiao et al., "Error-driven incremental learning in deep convolutional neural network for large-scale image classification", Proc. ACM Int. Conf. on Multi-media, ACM, pp. 177-186, 2014.
Roy et al., "Tree-CNN: A hierarchical deep convolutional neural network for incremental learning", arXiv preprint arXiv:1802.05800, 2018.
Rusu et al., "Progressive neural networks", arXiv preprint arXiv:1606.04671, 2016.
Terekhov et al., "Knowledge transfer in deep block-modular neural networks", Proc.Conf. Biomimetic and Biohybrid Systems, Springer, pp. 268-279, 2015.
Sandler et al., "MobilenetV2: Inverted residuals and linear bottlenecks", Proc. IEEE Conf. Computer Vision and Pattern Recognition, pp. 4510-4520, 2018.
Ma et al., "Shufflenet V2: Practical guidelines for efficient CNN architecture design", Proc. European Conf. Computer Vision, pp. 116-131, 2018.
Wu et al., "Shift: A zero FLOP, zeroparameter alternative to spatial convolutions", Proc. IEEE Conf. Computer Vision and Pattern Recognition, pp. 9127-9135, 2018.
Tan et al., "MnasNet: Platform-aware neural architecture search for mobile," arXiv preprint arXiv:1807.11626, 2018.
Dai et al., "ChamNet: Towards efficient network design through platform-aware model adaptation", Proc. IEEE Conf. Computer Vision and Pattern Recognition, 2019.
Hassantabar et al., "SCANN: Synthesis of compact and accurate neural networks", arXiv preprint arXiv:1904.09090, 2019.
Wen et al., "Learning structured sparsity in deep neural networks", Proc. Advances in Neural Information Processing Systems, pp. 2074-2082, 2016.
Yin et al., "Hardware-guided symbiotic training for compact, accurate, yet execution-efficient LSTM", arXiv preprint arXiv:1901.10997, 2019.
Han et al., "Deep compression: Compressing deep neural networks with pruning, trained quantization and Huffman coding", arXiv preprint arXiv:1510.00149, 2015.
Zhu et al., "Trained ternary quantization", arXiv preprint arXiv:1612.01064, 2016.

* cited by examiner

| Approach | #Training Epochs | | Accuracy |
|---|---|---|---|
| | New Data[1] | All Data | |
| Merged training | - | 49 | 98.67% |
| New data first (ours) | 15 | 20 | 98.67% |

1: The size of the new data is 10x smaller than the size of all data.

*FIG. 6*

| Network | Pruning Method | Error Rate % | #Parameters |
|---|---|---|---|
| LeNet-300-100 | Recoverable | 1.33 | 21.7K |
| | Non-recoverable | 1.40 | 12.2K |
| LeNet-5 | Recoverable | 0.83 | 7.9K |
| | Non-recoverable | 0.88 | 5.4K |
| ResNet-18 | Recoverable | 11.12 | 3.9K |
| | Non-recoverable | 11.25 | 2.8K |
| DeepSpeech2 | Recoverable | 11.7 | 5.7K |
| | Non-recoverable | 12.4 | 3.1K |

| Training Data Used | Error Rate (%) | | | #Parameters (K) | | | #Training Epochs | | |
|---|---|---|---|---|---|---|---|---|---|
| | TFS | NFT | NeST | Ours | TFS | NFT | NeST | Ours | TFS | NFT | NeST | Ours |
| 10% | 2.27 | 2.27 | 2.19 | 2.19 | 19.4 | 19.4 | 13.9 | 13.9 | 141 | 141 | 166 | 166 |
| 20% | 1.80 | 1.84 | 1.72 | 1.70 | 22.7 | 20.5 | 17.1 | 17.6 | 131 | 136 | 171 | 109 |
| 30% | 1.66 | 1.68 | 1.62 | 1.60 | 23.9 | 21.5 | 18.4 | 17.0 | 136 | 130 | 153 | 93 |
| 40% | 1.63 | 1.62 | 1.55 | 1.55 | 20.5 | 22.7 | 19.7 | 13.8 | 131 | 124 | 172 | 79 |
| 50% | 1.58 | 1.66 | 1.57 | 1.51 | 26.5 | 23.9 | 20.2 | 17.0 | 135 | 135 | 158 | 85 |
| 60% | 1.43 | 1.51 | 1.41 | 1.39 | 27.8 | 29.3 | 26.8 | 26.5 | 140 | 109 | 147 | 71 |
| 70% | 1.41 | 1.42 | 1.37 | 1.35 | 25.1 | 26.5 | 28.2 | 21.5 | 139 | 133 | 167 | 70 |
| 80% | 1.41 | 1.42 | 1.36 | 1.36 | 29.3 | 27.8 | 25.3 | 21.1 | 141 | 127 | 189 | 66 |
| 90% | 1.41 | 1.43 | 1.36 | 1.33 | 27.8 | 30.9 | 25.4 | 20.8 | 134 | 124 | 174 | 58 |
| 100% | 1.40 | 1.41 | 1.34 | 1.33 | 31.3 | 32.5 | 23.6 | 21.7 | 137 | 131 | 162 | 49 |

FIG. 11

| Training Data Used | Error Rate (%) | | | #Parameters (K) | | | #Training Epochs | | |
|---|---|---|---|---|---|---|---|---|---|
| | TFS | NFT | NeST | Ours | TFS | NFT | NeST | Ours | TFS | NFT | NeST | Ours |
| 10% | 1.62 | 1.62 | 1.45 | 1.45 | 5.3 | 5.3 | 4.9 | 4.9 | 148 | 148 | 162 | 162 |
| 20% | 1.28 | 1.30 | 1.22 | 1.23 | 5.9 | 6.5 | 5.8 | 5.5 | 141 | 126 | 177 | 110 |
| 30% | 1.01 | 1.05 | 1.01 | 0.97 | 6.5 | 6.1 | 6.1 | 6.2 | 136 | 118 | 187 | 92 |
| 40% | 0.97 | 0.99 | 0.93 | 0.92 | 6.5 | 6.8 | 6.0 | 5.9 | 151 | 134 | 154 | 80 |
| 50% | 0.95 | 1.00 | 0.93 | 0.93 | 7.2 | 6.8 | 6.3 | 6.0 | 135 | 141 | 161 | 83 |
| 60% | 0.93 | 0.97 | 0.89 | 0.90 | 8.8 | 7.6 | 7.9 | 7.5 | 120 | 119 | 153 | 69 |
| 70% | 0.90 | 0.94 | 0.89 | 0.87 | 8.0 | 8.4 | 6.9 | 6.3 | 129 | 99 | 168 | 66 |
| 80% | 0.90 | 0.90 | 0.88 | 0.87 | 7.6 | 8.8 | 7.5 | 7.1 | 131 | 119 | 151 | 52 |
| 90% | 0.88 | 0.91 | 0.89 | 0.87 | 10.9 | 9.8 | 8.2 | 7.9 | 124 | 127 | 149 | 56 |
| 100% | 0.88 | 0.90 | 0.84 | 0.83 | 10.3 | 10.2 | 8.1 | 7.9 | 129 | 115 | 161 | 43 |

FIG. 12

| Training Data Used | Error Rate (%) | | | #Parameters (K) | | | #Training Epochs | | |
|---|---|---|---|---|---|---|---|---|---|
| | TFS | NFT | NeST | Ours | TFS | NFT | NeST | Ours | TFS | NFT | NeST | Ours |
| 10% | 30.40 | 30.40 | 30.36 | 30.36 | 2.8 | 2.8 | 1.9 | 1.9 | 229 | 229 | 269 | 269 |
| 20% | 21.48 | 21.52 | 21.39 | 21.37 | 2.9 | 3.0 | 2.2 | 2.1 | 239 | 232 | 291 | 221 |
| 30% | 17.88 | 17.90 | 17.80 | 17.78 | 3.1 | 2.8 | 2.8 | 2.5 | 204 | 209 | 285 | 170 |
| 40% | 15.50 | 15.49 | 15.42 | 15.44 | 3.3 | 2.9 | 2.6 | 2.4 | 227 | 217 | 259 | 159 |
| 50% | 14.09 | 14.17 | 14.03 | 14.03 | 3.5 | 3.5 | 2.9 | 2.6 | 260 | 240 | 268 | 130 |
| 60% | 12.77 | 12.90 | 12.73 | 12.70 | 3.5 | 3.5 | 2.9 | 2.9 | 231 | 195 | 252 | 139 |
| 70% | 12.17 | 12.31 | 12.17 | 12.15 | 3.9 | 4.1 | 3.4 | 3.3 | 198 | 206 | 274 | 109 |
| 80% | 11.51 | 11.52 | 11.48 | 11.47 | 3.9 | 4.1 | 3.3 | 3.3 | 207 | 199 | 281 | 99 |
| 90% | 11.47 | 11.64 | 11.50 | 11.44 | 4.3 | 4.9 | 3.5 | 3.4 | 259 | 187 | 270 | 92 |
| 100% | 11.25 | 11.27 | 11.17 | 11.12 | 4.7 | 5.2 | 3.9 | 3.9 | 241 | 213 | 292 | 86 |

FIG. 13

| Training Data Used | Error Rate (%) | | | | #Parameters (K) | | | | #Training Epochs | | | |
|---|---|---|---|---|---|---|---|---|---|---|---|---|
| | TFS | NFT | NeST | Ours | TFS | NFT | NeST | Ours | TFS | NFT | NeST | Ours |
| 40% | 48.1 | 48.1 | 45.8 | 45.8 | 4.8 | 4.8 | 4.0 | 4.0 | 267 | 267 | 313 | 313 |
| 50% | 35.6 | 37.7 | 34.7 | 34.7 | 4.7 | 5.1 | 4.2 | 4.0 | 251 | 241 | 297 | 189 |
| 60% | 33.9 | 34.0 | 32.8 | 32.4 | 5.5 | 5.3 | 4.5 | 4.4 | 281 | 220 | 324 | 160 |
| 70% | 25.1 | 23.8 | 22.9 | 22.9 | 6.0 | 6.0 | 5.4 | 5.2 | 247 | 249 | 310 | 127 |
| 80% | 20.9 | 21.8 | 20.4 | 20.1 | 5.9 | 6.7 | 5.0 | 4.8 | 230 | 196 | 281 | 129 |
| 90% | 15.8 | 15.3 | 15.4 | 15.4 | 7.0 | 8.2 | 5.9 | 5.7 | 272 | 219 | 299 | 101 |
| 100% | 12.4 | 12.6 | 11.9 | 11.7 | 7.4 | 7.6 | 6.1 | 5.7 | 269 | 232 | 308 | 88 |

SYSTEM AND METHOD FOR INCREMENTAL LEARNING USING A GROW-AND-PRUNE PARADIGM WITH NEURAL NETWORKS

CROSS-REFERENCE TO RELATED APPLICATIONS

This application claims priority to provisional applications 62/851,740, filed May 23, 2019, which is herein incorporated by reference in its entirety.

STATEMENT REGARDING FEDERALLY SPONSORED RESEARCH OR DEVELOPMENT

This invention was made with government support under Grant No. CNS-1617640 awarded by the National Science Foundation. The government has certain rights in the invention.

FIELD OF THE INVENTION

The present invention relates generally to neural networks and, more particularly, to a system and method for incremental learning using a grow-and-prune paradigm for updating a neural network model to accommodate dynamic data.

BACKGROUND OF THE INVENTION

In recent years, deep neural networks (DNNs) have achieved remarkable success and emerged as an extraordinarily powerful tool for a wide range of machine learning applications. Their ability to represent input data through increasing layers of feature representations and knowledge distillation has been shown to be extremely effective in numerous application areas, such as image recognition, speech recognition, disease diagnosis, and neural machine translation. With increased access to large amounts of labeled training data (e.g., ImageNet with 1.2 million training images from 1,000 different categories) and computational resources, DNNs have resulted in human-like or even super-human performance on a variety of tasks.

A typical development process of a DNN starts with training a model based on the target dataset that contains a large amount of labeled training instances. The DNN learns to distill intelligence and extract features from the dataset in this process. The well-trained model is then used to make predictions for incoming unseen data. In such a setting, all the labeled data are presented to the network all-at-once for one training session.

While effective, this may be too idealized for many real-world scenarios where training data and their associated labels may be collected in a continuous and incremental manner, and only some data instances may be used initially to obtain the first trained model. For example, biomedical datasets are typically updated regularly when the number of data points obtained from patients increases, or disease trends shift across time. This makes it necessary to update a DNN model frequently to accommodate the new data and capture the new information effectively.

A widely-used approach for updating DNNs to learn new information involves discarding the existing model and retraining the DNN weights from scratch using all the data acquired so far. This method leads to a complete loss of all the previously accumulated knowledge in the pretrained network, and suffers from three major problems:

(1) Vast training cost: Training from scratch at each update is computationally- and time-intensive. Ideally, an incremental learning system should combine existing knowledge with new knowledge in a continuous and efficient manner, hence minimizing additional computational costs of an update.

(2) Fixed network capacity: Conventional DNN models have fixed and static architectures. As new data become available, it is not possible to increase their capacity during the entire training process.

(3) Massive redundancy: The generated DNN models derived for large real-world datasets are typically over-parameterized and can easily contain millions of parameters. Such a large model size incurs substantial storage and memory cost during inference.

As such, there is a need for a framework to more efficiently update DNNs without the above problems.

SUMMARY OF THE INVENTION

According to various embodiments, a method for generating a compact and accurate neural network for a dataset that has initial data and is updated with new data is disclosed. The method includes providing an initial neural network architecture for the initial data. The method further includes performing a first training on the initial neural network architecture to create a first trained neural network architecture. The first training includes growing one or more connections based on a gradient of each connection and iteratively pruning one or more connections based on a magnitude of each connection until a desired neural network architecture is achieved. The method additionally includes performing a second training on the first trained neural network architecture when the dataset is updated with new data to create a second trained neural network architecture. The second training includes growing one or more connections for the new data based on a gradient of each connection, growing one or more connections for the new data and the initial data based on a gradient of each connection, and iteratively pruning one or more connections based on a magnitude of each connection until a desired neural network architecture is achieved.

According to various embodiments, a system for generating a compact and accurate neural network for a dataset that has initial data and is updated with new data is disclosed. The system includes one or more processors. The processors are configured to perform a first training on an initial neural network architecture for the initial data to create a first trained neural network architecture. The first training includes growing one or more connections based on a gradient of each connection and iteratively pruning one or more connections based on a magnitude of each connection until a desired neural network architecture is achieved. The processors are further configured to perform a second training on the first trained neural network architecture when the dataset is updated with new data to create a second trained neural network architecture. The second training includes growing one or more connections for the new data based on a gradient of each connection, growing one or more connections for the new data and the initial data based on a gradient of each connection, and iteratively pruning one or more connections based on a magnitude of each connection until a desired neural network architecture is achieved.

According to various embodiments, a non-transitory computer-readable medium having stored thereon a computer program for execution by a processor configured to perform a method for generating a compact and accurate neural network for a dataset that has initial data and is updated with new data is disclosed. The method includes providing an initial neural network architecture for the initial data. The method further includes performing a first training on the initial neural network architecture to create a first trained neural network architecture. The first training includes growing one or more connections based on a gradient of each connection and iteratively pruning one or more connections based on a magnitude of each connection until a desired neural network architecture is achieved. The method additionally includes performing a second training on the first trained neural network architecture when the dataset is updated with new data to create a second trained neural network architecture. The second training includes growing one or more connections for the new data based on a gradient of each connection, growing one or more connections for the new data and the initial data based on a gradient of each connection, and iteratively pruning one or more connections based on a magnitude of each connection until a desired neural network architecture is achieved.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 6 depicts a table of training cost comparison between merged training and new data first approaches according to an embodiment of the present invention;

FIG. 7 depicts a table of a comparison of models derived from recoverable and non-recoverable pruning according to an embodiment of the present invention;

FIG. 10 depicts a table of experimental results for LeNet-300-100 on the MNIST dataset according to an embodiment of the present invention;

FIG. 11 depicts a table of experimental results for LeNet-5 on the MNIST dataset according to an embodiment of the present invention;

FIG. 12 depicts a table of experimental results for REsNet-18 on the ImageNet dataset according to an embodiment of the present invention; and FIG. 13 depicts a table of experimental results for DeepSpeech2 with H-LSTM on the AN4 dataset according to an embodiment of the present invention.

DETAILED DESCRIPTION OF THE INVENTION

Deep neural networks (DNNs) have become a widely deployed model for numerous machine learning applications. However, their fixed architecture, substantial training cost, and significant model redundancy make it difficult to efficiently update them to accommodate previously unseen data.

To solve these problems, embodiments generally disclosed herein depict an incremental learning framework based on a grow-and-prune neural network synthesis paradigm. When new data arrive, the neural network first grows new connections based on the gradients to increase the network capacity to accommodate new data. Then, the framework iteratively prunes away connections based on the magnitude of weights to enhance network compactness, and hence recover efficiency. Finally, the model rests at a lightweight DNN that is both ready for inference and suitable for future grow-and-prune updates. The disclosed framework improves accuracy, shrinks network size, and significantly reduces the additional training cost for incoming data compared to previous approaches, such as training from scratch and network fine-tuning.

For the LeNet-300-100 (LeNet-5) neural network architectures derived for the MNIST dataset, the framework reduces training cost by up to 64% (67%), 63% (63%), and 69% (73%) compared to training from scratch, network fine-tuning, and grow-and-prune from scratch, respectively. For the ResNet-18 architecture derived for the ImageNet dataset (DeepSpeech2 for the AN4 dataset), the corresponding training cost reductions against training from scratch, network fine-tuning, and grow-and-prune from scratch are 64% (67%), 60% (62%), and 72% (71%), respectively. The derived models contain fewer network parameters but achieve higher accuracy relative to previous baselines.

General Overview

Figure 1:
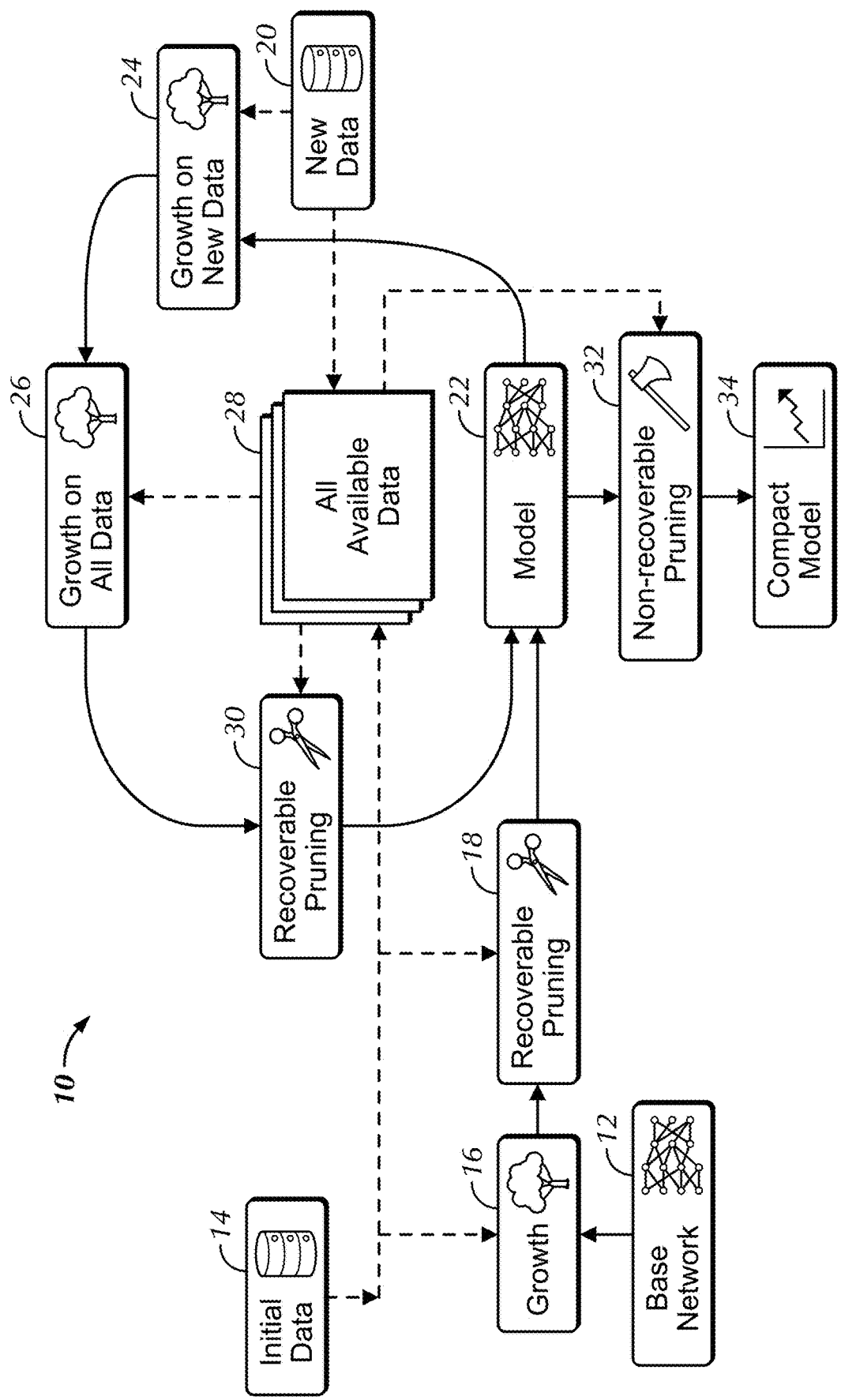
FIG. 1 depicts a general flowchart of the disclosed framework according to an embodiment of the present invention.

Disclosed herein is an incremental learning framework based on a grow-and-prune neural network synthesis paradigm. It includes two sequential training stages in a model update process: gradient-based growth and magnitude-based pruning. A general flowchart 10 of the framework is depicted in FIG. 1. The dashed lines depict the data flow path and the solid lines depict the model update process.

First, a base model 12 with initial data 14 undergoes growth 16 and pruning 18. When new data 20 arrive, the network model 22 undergoes a first growth phase 24 based on the new data 20 and then a second growth phase 26 based on all available data 28 that increases its size to accommodate new data and knowledge.

Then, a two-step pruning phase is employed to remove redundant parameters to obtain a compact inference model. First, recoverable pruning 30 is used to acquire a compact model 22 that is subjected to the next grow-and-prune update. Then, non-recoverable pruning 32 may be used to achieve an ultra-compact model 34, which is typically about 1.5-2× smaller than a compact model derived from recoverable pruning. The ultra-compact model is especially useful if an application imposes a strict resource constraint.

System Overview

Figure 2:
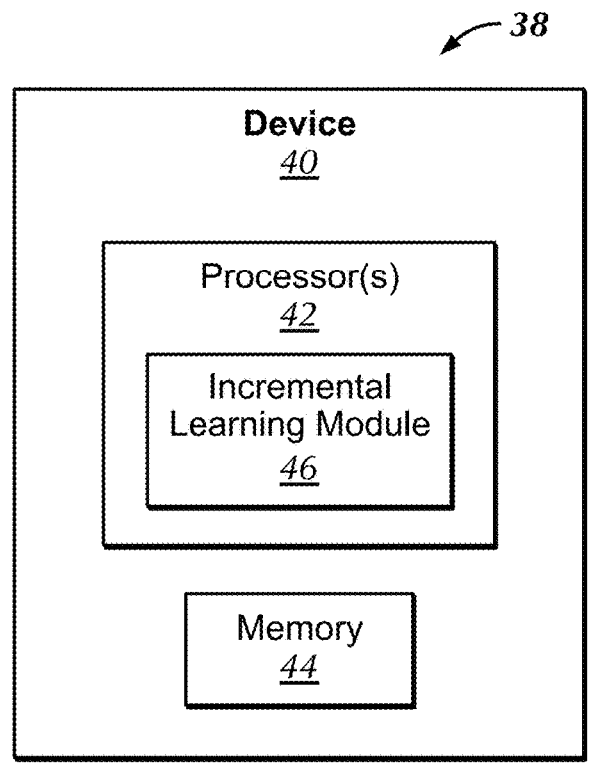
FIG. 2 depicts a block diagram of a system for implementing the disclosed framework according to an embodiment of the present invention.

FIG. 2 illustrates a system 38 configured to implement the incremental learning framework described above. The system 38 includes a device 40, which may be implemented in a variety of configurations including general computing devices such as but not limited to desktop computers, laptop computers, tablets, network appliances, and the like. The device 40 may also be implemented as a mobile device such as but not limited to a mobile phone, smart phone, smart watch, or tablet computer. The device 40 can also include but is not limited to Internet of Things (IoT) devices such as IoT sensors. The device 40 includes one or more processors 42 such as but not limited to a central processing unit (CPU), a graphics processing unit (GPU), a field programmable gate array (FPGA), or an application-specific integrated circuit (ASIC) for performing specific functions and memory 44 for storing those functions. The processor 42 includes an incremental learning module 46 for implemental the disclosed incremental learning framework generally described above. The incremental learning module 46 framework will be described in greater detail below.

Incremental Learning

Incremental learning refers to the process of learning when input data gradually become available. The goal of incremental learning is to let the machine learning model preserve existing knowledge and adapt to new data at the same time. However, aiming to achieve these two goals simultaneously suffers from the stability-plasticity dilemma: a purely stable model is able to conserve all prior knowledge, but cannot accommodate any new data or information, whereas a completely plastic model has the opposite problem.

Ideally, an incremental learning framework should have the following characteristics:

Flexible capacity: The incremental learning framework should be able to dynamically adjust the model's learning capability to accommodate newly available data and information.

Efficient update: Updating the framework when new data become available should be efficient and incur only minimal overhead.

Preserving knowledge: The framework should maintain existing knowledge in the update process, and avoid restarting training from scratch.

Compact inference model: It is beneficial to generate a lightweight DNN model for efficient inference.

The disclosed framework addresses the stability-plasticity dilemma and satisfies all the above requirements, to be described in greater detail below.

Hidden-Layer Long Short-Term Memory (H-LSTM)

Figure 3:
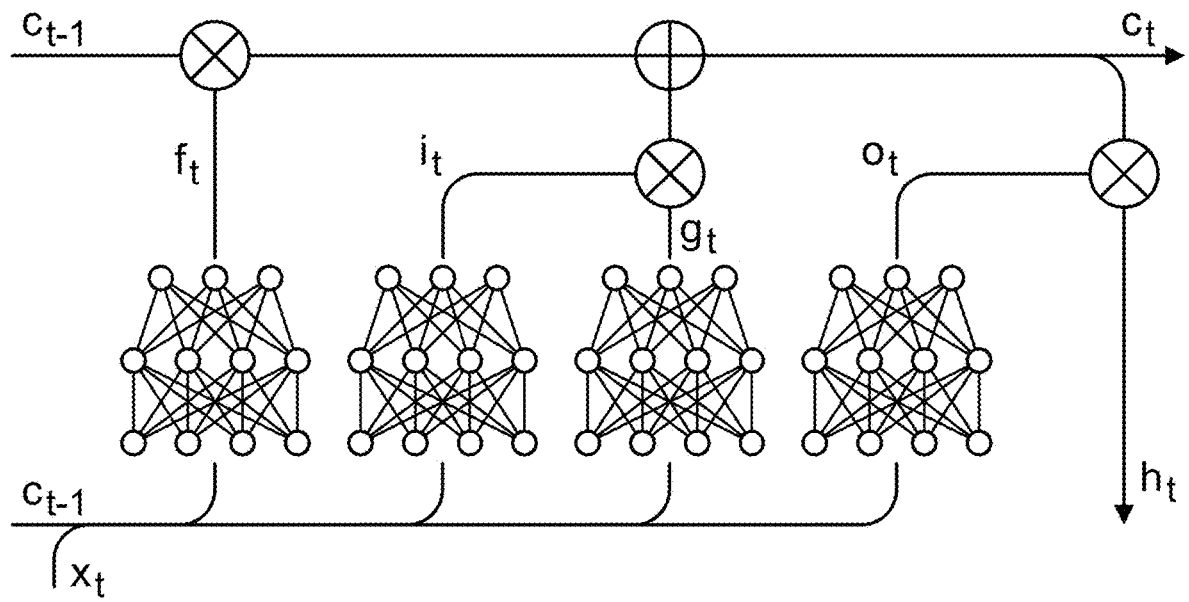
FIG. 3 depicts a schematic diagram of an H-LSTM cell where MLP neural networks are used in control gates according to an embodiment of the present invention.

An H-LSTM is an LSTM variant with improved performance and efficiency. It introduces multi-level information extraction or distillation in the control gates of LSTMs that utilize multi-layer perceptron (MLP) neural networks, as shown in FIG. 3. In FIG. 3, $c_{t-1}$ and $h_{t-1}$ refer to the cell state tensor and hidden state tensor, respectively, at step t−1; $x_t$, $h_t$, $c_t$, $f_t$, $i_t$, $o_t$, and $g_t$ refer to the input tensor, hidden state tensor, cell state tensor, forget gate, input gate, output gate, and tensor for cell updates at step t, respectively; and $\otimes$ and $\oplus$ refer to the element-wise multiplication operator and element-wise addition operator, respectively.

The MLP gates in an H-LSTM enhance gate control and increase the learning capability of the cell. Moreover, they enable drop-out to be used to optimize the control gates and thus alleviate the regularization difficulty problem faced by LSTM cells. As a result, an H-LSTM based recurrent neural network (RNN) achieves higher accuracy with much fewer parameters and lower run-time latency compared to an LSTM based RNN for many applications, e.g., image captioning and speech recognition.

H-LSTMs are further described in PCT Application Serial No. PCT/US19/22246, which is herein incorporated by reference in its entirety.

Methodology

Figure 4:
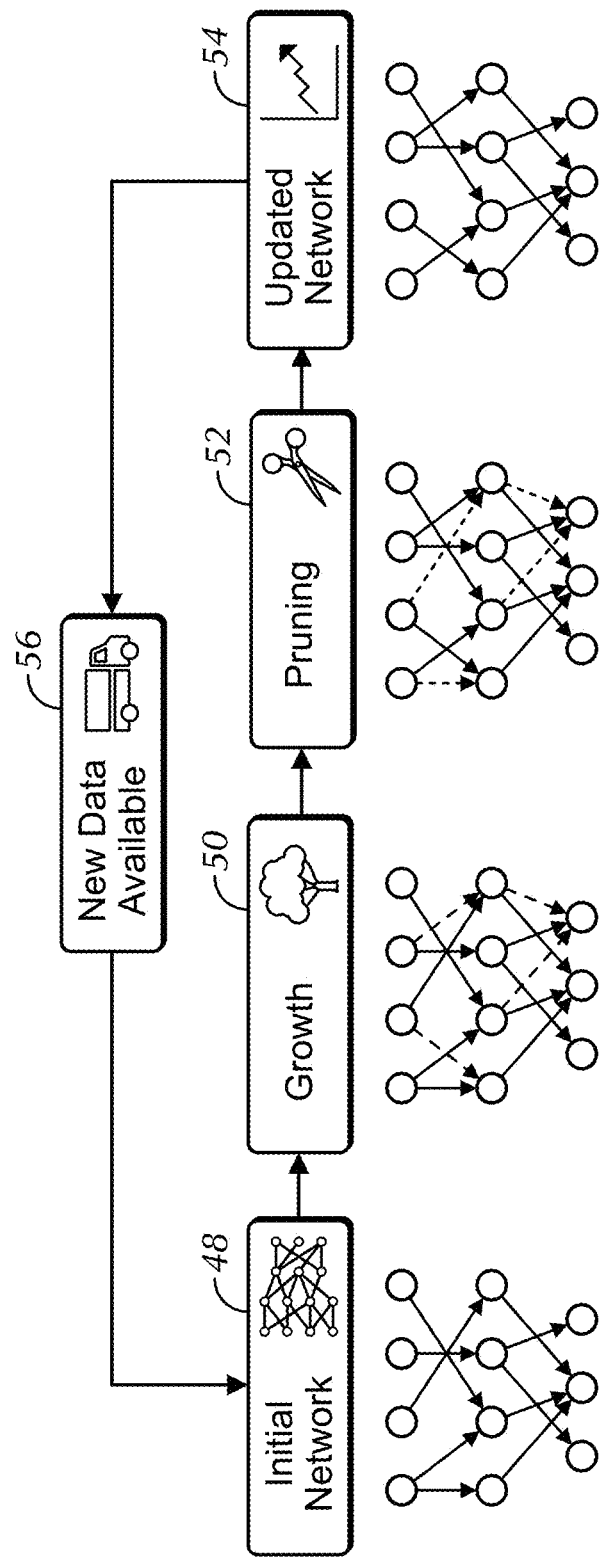
FIG. 4 depicts a flowchart of a grow-and-prune paradigm in the disclosed framework according to an embodiment of the present invention.

As mentioned earlier, the disclosed framework is based on a grow-and-prune paradigm, which enables the model to dynamically and adaptively adjust its architecture to accommodate new data and information. The growth and pruning process is depicted in FIG. 4, where the double and single dashed lines refer to the newly grown and pruned connections, respectively.

The initial network 48 inherits the architecture and weights from the model derived in the last update (or uses random weight initialization when starting from scratch for the first model). In the model update process, the framework utilizes two sequential steps to update the DNN model: gradient-based growth 50 and magnitude-based pruning 52. The network gradually grows new connections based on the gradient information (extracted using the back-propagation algorithm) obtained in the growth phase 50. Then, it iteratively removes redundant connections based on their magnitudes in the pruning phase 52. Finally, it rests at a compact and accurate inference model that is ready for deployment the next update 54. When new data is available 56, the process repeats itself Growth Phase:

When new data become available, a gradient-based growth approach is used to adaptively increase the network capacity in order to accommodate new knowledge. The pre-growth network is typically a sparse and partially-connected DNN. In one embodiment, a mask tensor Msk is used to disregard the 'dangling' connections (connections that are not used in the network) for each weight tensor W. Msk tensors only have binary values (0 or 1) and have the same size as their corresponding W tensor.

Three sequential steps are employed to grow new connections:

Gradient evaluation: First the gradient for all the 'dangling' connections are evaluated. In the network training process, the gradient of all weights (W.grad) are extracted for each mini-batch of training data with the back-propagation algorithm. This process is repeated and W.grad is accumulated over a whole training epoch. Then, the average gradients are calculated over the entire epoch. Note that the parameter update is paused in the gradient evaluation procedure.

Connection growth: Then, the connections with large gradients are activated. Specifically, a connection w is activated by manually setting the value of its corresponding mask to be 1 if and only if the following condition is met:

$$|w \cdot grad| \geq \alpha^{th} \text{ percentile of } |W \cdot grad| \quad (1)$$

where $\alpha$ is a pre-defined parameter, such as but not limited to $30 \leq \alpha \leq 50$. This policy helps activate connections that are the most efficient at reducing the loss function L. This is because connections with large gradient also have large derivates of L:

$$w \cdot grad = \frac{\partial L}{\partial w} \qquad (2)$$

Weight initialization: The weights of newly added connections are initialized to η×w.grad, where η is the current learning rate for training.

Connection growth and parameter training are interleaved in the growth phase, where connection growth is periodically conducted during training. Stochastic gradient descent is employed in both the architecture space and parameter space in this process.

Figure 5:
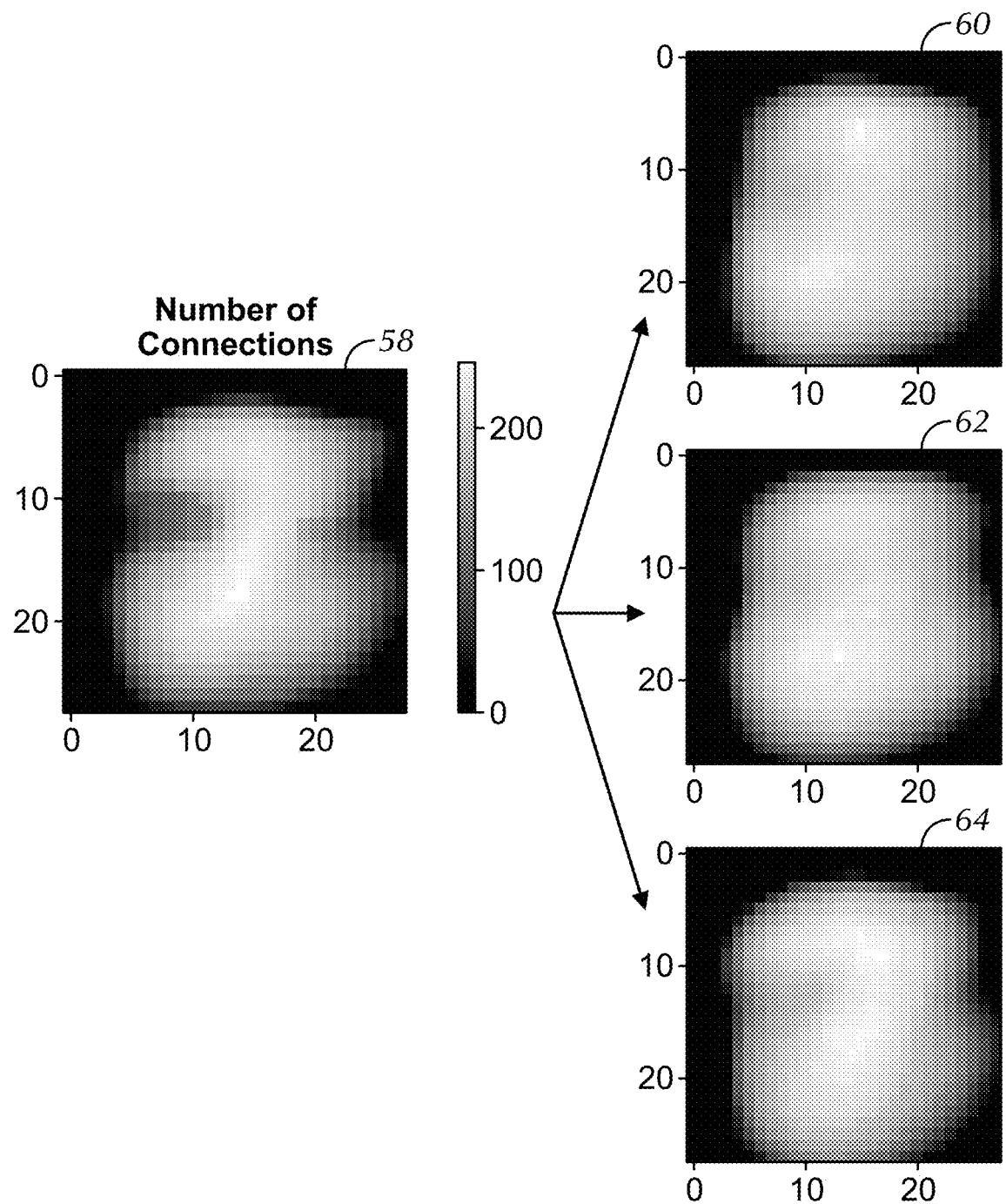
FIG. 5 depicts a graph of grown connections from the input layers to the first hidden layer of LeNet-300-100 with different training data added according to an embodiment of the present invention.

The connection growth policy effectively adapts the model architecture to accommodate newly available data and information. To illustrate this, the total number of connections are extracted and plotted from each input image pixel to the first hidden layer of the post-growth LeNet-300-100 (for the MNIST dataset, in which the images are handwritten digits of size 28×28) in FIG. 5. The initial model 58 is trained with data that has the label '1' or '2', and thus the connection density distribution is similar to an overlap of digits '1' and '2'. Then, an additional class is added with labels '0', '6', and '7', and the corresponding connection density distribution of the post-growth network is plotted in graphs 60, 62, and 64, respectively. It is observed that the network architecture evolves to adapt to the new class of data.

To reduce the training cost of a model update, a mechanism is introduced to speed up the growth phase. Specifically, connection growth and parameter training are first employed only on the previously unseen data for a pre-defined number of epochs whenever new data become available. Then, the new data is merged with all the previously available training data, and growth and training are performed on all existing data.

This 'new data first' policy enables a rapid learning process and architecture update on the new data and significantly reduces overall training cost in the growth phase. The number of training epochs for LeNet-300-100 are compared in the table in FIG. 6 using two different approaches:

Merged training: Merge the new data and existing data, and conduct connection growth and parameter training on all data.

New data first: Perform growth and training on new data first, then combine the new data and existing data, and finally grow and train on all available data.

In FIG. 6, the initial model is trained on 90% of the MNIST training data. New data and all data refer to the remaining 10% of training data and the entire MNIST training set, respectively. To reach the same target accuracy of 98.67%, the disclosed method only requires 15 and 20 training epochs first on new data and then on all data, respectively. Since the number of training instances in new data is 10× smaller than in all data, the cost of 15 training epochs on new data is equivalent to only 1.5 epochs of training on all data. Thus, the training cost of the disclosed approach (15 epochs on new data plus 20 epochs on all data) is equivalent to 21.5 epochs of training on all data. As a result, the disclosed method reduces the growth phase training cost by 2.3× compared to merged training, which requires 49 epochs of training on all data.

Pruning Phase:

DNNs are typically over-parameterized and pruning is an effective method to remove redundancy. Thus, redundant connections are pruned away for compactness and to ensure efficient inference after the growth phase.

The pruning policy removes weights based on their magnitudes. In the pruning process, we remove a connection w is removed by setting its value as well as the value of its corresponding mask to 0 if and only if the following condition is satisfied:

$$|w| \leq \beta^{th} \text{ percentile of } |W| \qquad (3)$$

where β is a pre-defined pruning ratio, such as but not limited to 3≤β≤5. Note that connection pruning is an iterative process. In each iteration, the weights that have the smallest values (e.g. smallest 5%) are pruned, and the network is retrained to recover its accuracy. Once a desired accuracy is achieved, the next pruning iteration is started.

It is important for the incremental learning framework to be sustainable and support long-term learning. This is because the model needs to be updated frequently for a long period of time in many real-world scenarios. In such settings, the growth and pruning process needs to be executed over numerous cycles. To support long-term learning, the gradient-based growth phase should be able to fully recover the network capacity, architecture, and accuracy from the last post-pruning model. To achieve this, a recoverable pruning is employed in the main grow-and-prune based model update process.

A pruning process is recoverable if and only if both of the following conditions are satisfied:

No neuron pruning: Each neuron in the post-pruning network has at least one input connection and one output connection. This ensures gradient flow in the growth phase in the next update.

No accuracy loss: The post-pruning model has the same or higher accuracy than the pre-pruning model.

This prevents information loss in the pruning phase. In addition, a leaky rectified linear unit (ReLU) with a reverse slope of 0.01 is used as the activation function ƒ in the entire model update process:

$$f(x) = \max(0.01x, x) \qquad (4)$$

This prevents the 'dying' neuron problem (a ReLU with constant 0 output has no back-propagated gradient). It keeps all the neurons active and thus the number of neurons does not decrease even after numerous cycles of growth and pruning.

Some real-world scenarios (e.g., real-time video processing on mobile platforms and local inference on edge devices) may have very stringent computation cost constraints. Thus, a non-recoverable pruning may be included as an optional post-processing step to trade in accuracy and recoverability for extreme compactness. In this process, both conditions for recoverable pruning can be violated, and there is no guarantee that another gradient-based growth phase can fully recover the architecture. However, non-recoverable pruning effectively shrinks the model size further with only a minor loss in accuracy, to be shown below. For example, it provides an additional 1.8× compression on top of recoverable pruning on LeNet-300-100, with only a 0.07% absolute accuracy loss on the MNIST dataset. A detailed comparison between the models derived from recoverable and non-recoverable pruning is depicted in the table in FIG. 7, where the error rates for ResNet-18 and DeepSpeech2 refer to the top-5 error rate and the word error rate (WER), respectively.

Experimental Results

An embodiment of the disclosed framework was implemented using PyTorch on Nvidia GeForce GTX 1060 GPU (with 1.708 GHz frequency and 6 GB memory) and Tesla P100 GPU (with 1.329 GHz frequency and 16 GB memory). CUDA 8.0 and CUDNN 5.1 libraries were employed in the experiments. The experimental results for image classification are reported on the MNIST and ImageNet datasets and speech recognition are reported on the AN4 dataset.

Figure 8:
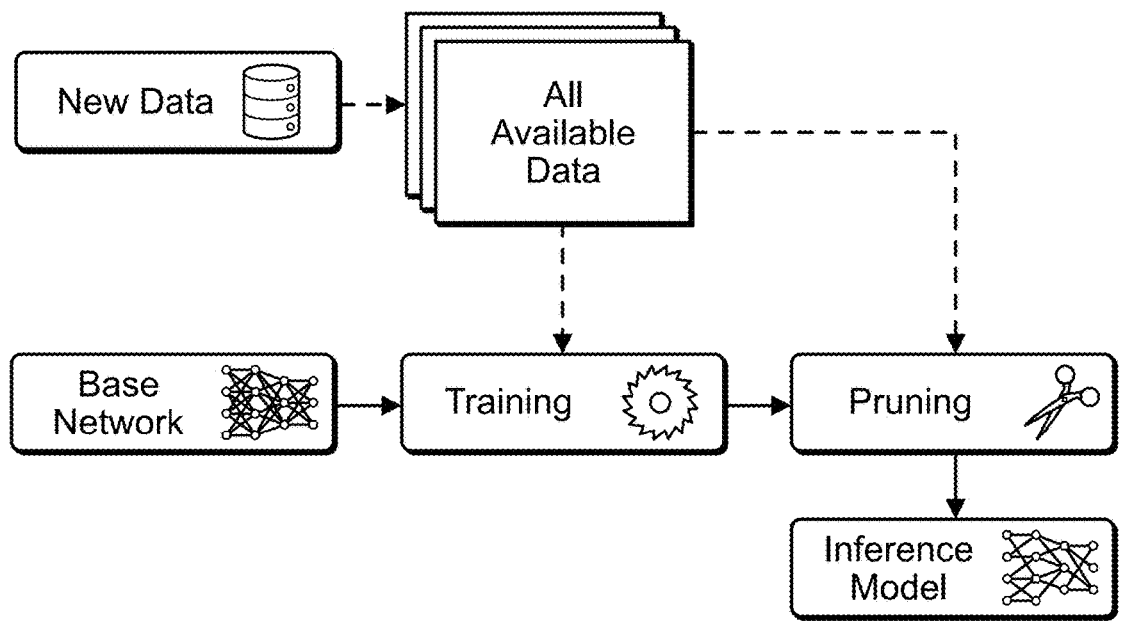
FIG. 8 depicts a flow chart of a training from scratch methodology according to an embodiment of the present invention.

To validate the effectiveness of the disclosed incremental framework, it is compared with three other methods (TFS, NFT, and NeST), each described briefly below:

TFS: Whenever a model update is needed, a model is trained from scratch with all available data, and then pruned for compactness. This approach is depicted in FIG. 8.

Figure 9:
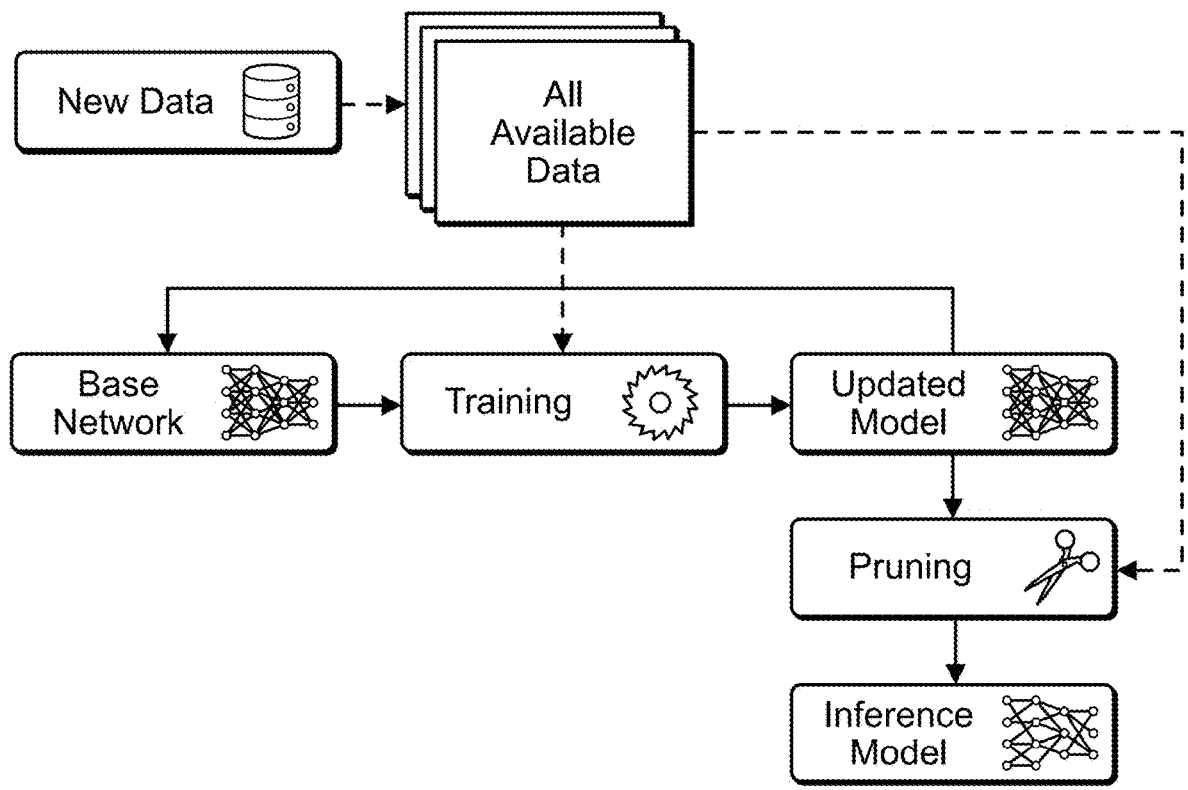
FIG. 9 depicts a flow chart of a network fine-tuning methodology according to an embodiment of the present invention.

NFT: A model is maintained with all the connections activated and trained on all available data whenever an update is required. The generated model can be used for the next update. Then, a copy of the model is made and pruned for compactness. This approach is depicted in FIG. 9.

NeST: The NeST approach is a grow-and-prune paradigm-based network synthesis approach disclosed in PCT Application Serial No. PCT/US18/57485, which is herein incorporated by reference in its entirety. It replaces the training phase in the TFS approach with a network growth phase. Although the growth phase leads to extra training epochs, it yields inference models with higher accuracy and compactness.

LeNets on MNIST:

The effectiveness of the disclosed methodology is first shown using LeNet-300-100 and LeNet-5 on the MNIST dataset.

Architectures: Two different base networks are targeted in the experiments: LeNet-300-100 and LeNet-5. LeNet-300-100 is an MLP neural network with two hidden layers with 300 and 100 neurons each. LeNet-5 is a CNN with four hidden layers (two convolutional and two fully-connected (FC) layers). The two convolutional layers share the same kernel size of 5×5 and contain 6 and 16 filters, respectively, whereas the two FC layers have 120 and 84 neurons, respectively. The total number of network parameters in LeNet-300-100 and LeNet-5 is 266K and 59K, respectively.

Dataset: Results are reported on the MNIST dataset. It has 70K (60K for training and 10K for testing) hand-written digit images of size 28×28. 5K images are randomly reserved from the training set to build the validation set. Affine distortions are introduced to the training instances for data augmentation.

Training: The training set (with 55K images) is randomly split into ten different parts of equal size. In the incremental learning experiments, one part is started with to train the initial model for subsequent updates. Then, one part is added as new data each time in the incremental learning scenario. For each update, growth is performed on new data and all data for 15 epochs and 20 epochs in the growth phase, respectively. Then, the post-growth network is pruned for compactness. As for TFS and NFT, the model is trained for 60 epochs, then pruned iteratively. For NeST, the network is grown for 90 epochs, then pruned. Note that all the models share the same recoverable pruning policy for a fair comparison of model size.

The test error rate, number of parameters, and number of training epochs are compared for the three approaches on LeNet-300-100 and LeNet-5 in the tables in FIGS. 10 and 11, respectively. Incremental learning is executed ten times in the experiments. In all the cases except the first round, the disclosed method almost always simultaneously delivers higher accuracy, reduced or equal model size, and less training cost relative to all the three other approaches. For example, when the last 10% training data is added to the existing 90% data, the grow-and-prune paradigm-based incremental learning methodology leads to 0.07% (0.08%) absolute accuracy gain, 31% (33%) model size reduction, and 64% (63%) training cost reduction compared to the TFS (NFT) approach on LeNet-300-100. Similar improvements are observed on LeNet-5.

It is to be noted that the disclosed incremental learning framework has higher training cost for the initial model (where only 10% training data are available). This is as expected since there is no existing model or knowledge for the initial model to start from, and thus all three approaches have to employ random initialization and start from scratch. However, whenever a pre-trained model with existing knowledge is available, the disclosed incremental learning approach always produces reduced training cost due to its capability of preserving existing knowledge effectively and distilling knowledge from new data efficiently.

ResNet-18 on ImageNet:

Here, the network architecture is scaled up to ResNet-18 and the dataset to ImageNet, which is a widely-used benchmark for image recognition.

Architecture: ResNet is a milestone CNN architecture. The introduced residual connections alleviate the exploding and vanishing gradient problem in the training of DNNs with large depth, and yield substantial accuracy improvements. ResNet-18 is used as the base network in the experiment. It has 17 convolutional layers and one FC layer. The total number of parameters in ResNet-18 is 11.7M.

Dataset: The results are reported on the ImageNet dataset. This is a large-scale dataset for image-classifying DNNs. It has 1.2M and 50K images from 1,000 distinct categories for training and validation, respectively. Since there is no publicly available test set, 50 images are randomly withheld from each class in the training set to build a validation set (50K images in all), and the original validation set is used as the test set. The test accuracy is reported in the experiment.

Training: Similar to the previous experiments on the MNIST dataset, the training set is separated evenly and randomly into ten different chunks. One chunk is used as the initially available data and one chunk is added as new data each time. Growth is performed on new data and all data for 20 epochs and 30 epochs in the growth phase in the disclosed approach, respectively. The model is trained for 90 epochs for the TFS and NFT baselines. The network is grown for 120 epochs for the NeST baseline. In the pruning phase, all methods share the same recoverable pruning policy for a fair model size comparison. The table in FIG. 12 compares three different metrics (top-5 error rate, number of parameters, and number of training epochs) for the three different approaches. The disclosed approach again outperforms all baselines in most cases.

DeepSpeech2 on AN4:

Another important machine learning application, speech recognition, is considered here. The DeepSpeech2 architecture with an H-LSTM on the AN4 dataset is considered here.

Architecture: DeepSpeech2 is a popular architecture for speech recognition. It has three convolutional layers, three recurrent layers, one FC layer, and one connectionist temporal classification layer. The inputs of the network are Mel-frequency cepstral coefficients of the sound power spectrum. Bi-directional H-LSTM recurrent layers are used in the experiments and the hidden state width for the HLSTM cells is set to 800. A dropout ratio of 0.2 is introduced for the hidden layers in the H-LSTM cells.

Dataset: The speech recognition dataset in the experiment is the AN4 dataset, which has 948 and 130 utterances for training and validation, respectively. 100 utterances are randomly reserved from the training set as the validation set, and the original validation set is used as the test set.

Training: The training set is first divided evenly and randomly into ten different parts. An initial model is first trained based on partial training data and then updated based on the remaining parts. To train an initial model with acceptable accuracy, the minimum amount of training data is found to be 40% of all available training data (i.e., four parts). A decrease in this amount leads to an abrupt drop in accuracy (>80% WER when only three parts are used). Then, one part is added each time to update the model. For the model growth phase, the network is first grown for 20 epochs based on only the newly added data, and then 30 epochs when the new part is merged with existing ones. The model is trained for 120 epochs for the NFT and TFS baselines. The network is grown for 150 epochs for the NeST baseline. Recoverable pruning is conducted for all the methods in pursuit of model compactness.

The WER and number of parameters are compared for the models derived from the three different approaches as well as their corresponding training epochs in the table in FIG. 13. A significant improvement is observed in the trade-offs among accuracy, model size, and training cost in the disclosed incremental learning framework. For example, when the last 10% training data is added, the disclosed model achieves 0.7%, 0.9%, and 0.2% lower WER and 30%, 33%, and 7% additional compression ratio with 67%, 62%, and 71% less training cost compared to the TFS, NFT, and NeST approach.

CONCLUSION

As such, embodiments generally disclosed herein depict a brain-inspired incremental learning framework based on a grow-and-prune paradigm. Gradient-based growth and magnitude-based pruning are combined in the model update process. The effectiveness and efficiency of the disclosed methodology is shown for different tasks on different datasets. For LeNet-300-100 (LeNet-5) on the MNIST dataset, the training cost was cut down by up to 64% (67%) compared to the TFS approach, 63% (63%) compared to the NFT approach, and 69% (73%) compared to the NeST approach. For ResNet-18 on the ImageNet dataset (DeepSpeech2 on the AN4 dataset), the training epochs were reduced by up to 64% (67%) compared to the TFS approach, 60% (62%) compared to the NFT approach, and 72% (71%) compared to the NeST approach. The derived models have improved accuracy (or reduced error rate) and more compact network architecture.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A method for generating a compact and accurate neural network for a dataset that has initial data and is updated with new data, the method comprising:
   providing an initial neural network architecture for the initial data;
   performing a first training on the initial neural network architecture to create a first trained neural network architecture, the first training comprising:
      growing one or more connections based on a gradient of each connection; and
      iteratively pruning one or more connections based on a magnitude of each connection until a desired neural network architecture is achieved; and
   performing a second training on the first trained neural network architecture when the dataset is updated with new data to create a second trained neural network architecture, the second training comprising:
      growing one or more connections for the new data based on a gradient of each connection;
      growing one or more connections for the new data and the initial data based on a gradient of each connection; and
      iteratively pruning one or more connections based on a magnitude of each connection until a desired neural network architecture is achieved,
   wherein the growing in the first training and both growing in the second training each comprise adding connections whose gradient magnitude surpasses a predefined percentile of gradient magnitudes based on a growth ratio,
   wherein the iterative pruning in the first training and the second training each comprise removing connections whose magnitudes are smaller than a predefined percentile of magnitudes based on a pruning ratio.

2. The method of claim 1, wherein the iterative pruning in the first training and the second training each comprise recoverable pruning.

3. The method of claim 1, wherein the iterative pruning in the second training comprises recoverable pruning and non-recoverable pruning.

4. The method of claim 1, wherein the growing in the first training comprises disregarding dangling connections with a mask tensor.

5. The method of claim 1, wherein the iterative pruning in the first training and the second training continues until a predefined accuracy threshold is reached.

6. A system for generating a compact and accurate neural network for a dataset that has initial data and is updated with new data, the system comprising one or more processors configured to:
   perform a first training on an initial neural network architecture for the initial data to create a first trained neural network architecture, the first training comprising:
      growing one or more connections based on a gradient of each connection; and
      iteratively pruning one or more connections based on a magnitude of each connection until a desired neural network architecture is achieved; and
   perform a second training on the first trained neural network architecture when the dataset is updated with new data to create a second trained neural network architecture, the second training comprising:

growing one or more connections for the new data based on a gradient of each connection;

growing one or more connections for the new data and the initial data based on a gradient of each connection; and iteratively pruning one or more connections based on a magnitude of each connection until a desired neural network architecture is achieved, wherein the growing in the first training and both growing in the second training each comprise adding connections whose gradient magnitude surpasses a predefined percentile of gradient magnitudes based on a growth ratio, and wherein the iterative pruning in the first training and the second training each comprise removing connections whose magnitudes are smaller than a predefined percentile of magnitudes based on a pruning ratio.

7. The system of claim 6, wherein the iterative pruning in the first training and the second training each comprise recoverable pruning.

8. The system of claim 6, wherein the iterative pruning in the second training comprises recoverable pruning and non-recoverable pruning.

9. The system of claim 6, wherein the growing in the first training comprises disregarding dangling connections with a mask tensor.

10. The system of claim 6, wherein the iterative pruning in the first training and the second training continues until a predefined accuracy threshold is reached.

11. A non-transitory computer-readable medium having stored thereon a computer program for execution by a processor configured to perform a method for generating a compact and accurate neural network for a dataset that has initial data and is updated with new data, the method comprising:

providing an initial neural network architecture for the initial data;

performing a first training on the initial neural network architecture to create a first trained neural network architecture, the first training comprising:

growing one or more connections based on a gradient of each connection; and iteratively pruning one or more connections based on a magnitude of each connection until a desired neural network architecture is achieved; and performing a second training on the first trained neural network architecture when the dataset is updated with new data to create a second trained neural network architecture, the second training comprising:

growing one or more connections for the new data based on a gradient of each connection;

growing one or more connections for the new data and the initial data based on a gradient of each connection; and iteratively pruning one or more connections based on a magnitude of each connection until a desired neural network architecture is achieved, wherein the growing in the first training and both growing in the second training each comprise adding connections whose gradient magnitude surpasses a predefined percentile of gradient magnitudes based on a growth ratio, and wherein the iterative pruning in the first training and the second training each comprise removing connections whose magnitudes are smaller than a predefined percentile of magnitudes based on a pruning ratio.

12. The non-transitory computer-readable medium of claim 11, wherein the iterative pruning in the first training and the second training each comprise recoverable pruning.

13. The non-transitory computer-readable medium of claim 11, wherein the iterative pruning in the second training comprises recoverable pruning and non-recoverable pruning.

14. The non-transitory computer-readable medium of claim 11, wherein the growing in the first training comprises disregarding dangling connections with a mask tensor.

15. The non-transitory computer-readable medium of claim 11, wherein the iterative pruning in the first training and the second training continues until a predefined accuracy threshold is reached.

* * * * *